Patented June 5, 1934

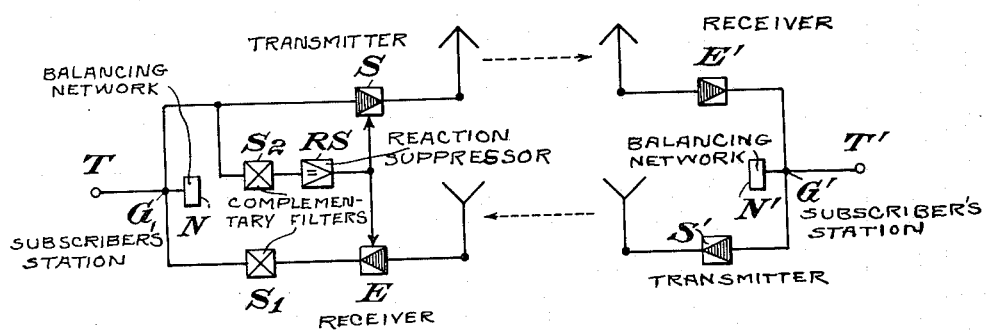
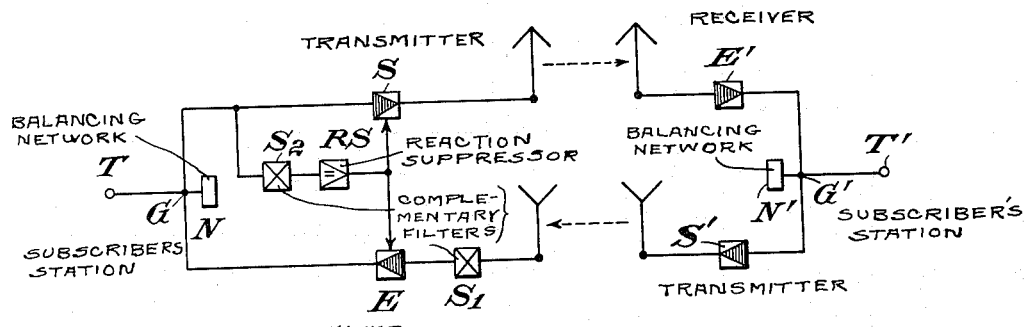

1,962,026

UNITED STATES PATENT OFFICE 1,962,026

DUPLEX TRANSMISSION SYSTEM

Hans Mayer, Berlin-Charlottenburg, and Ladislaus Fenyö, Berlin-Siemensstadt, Germany, assignor to Siemens & Halske Aktiengesellschaft, Siemensstadt, near Berlin, Germany, a corporation of Germany Application January 21, 1930, Serial No. 422,275
In Germany January 28, 1929

2 Claims. (Cl. 179—170)

Our invention relates to improvements in duplex transmission systems, and more particularly in such systems of this type in which reaction or singing phenomena are suppressed by apparatus controlled by the currents transmitted. Our invention may also be employed in conjunction with other devices, such as echo suppressors or killers and is particularly suitable for use in radio telephone systems.

In duplex or two-way transmission systems difficulties arise in the application of so-called reaction suppressors or anti-singing devices if the conditions of transmission change greatly or the transmitting means, wires or the ether, are subject to disturbances of changing strength. In radio connections the strength of the currents received, for instance, fluctuates considerably due to fading and on the other hand the level of the disturbance currents lies high in comparison with that of the communication currents. The difficulties in the transmission of speech reside, for instance, primarily in the fact that the suppressors must respond also to the speech currents of low amplitude, for example those originating from consonants, but should not be rendered operative by disturbance currents. As a matter of fact the switching operations are released (that is to say, initiated or controlled) by a mixture of communication and disturbance currents, the amplitude ratio of both kinds of currents being liable to change continuously. High disturbance voltages cause errors in the control, and strong increases of attenuation, for instance by fading phenomena, may cause a dropping out of the beginnings of words or even entire words so that the connection fails just when it is badly wanted, because the suppressors are particularly important when the stability of the connection is endangered by the changing conditions of the transmission.

The defects of the known systems are according to our invention eliminated by suppressing in one direction of transmission a portion of the frequency range of the transmitted currents, which is immaterial or less important for the transmission and feeding in the other direction of transmission that portion of the frequency range of the transmitted currents which corresponds to the frequency range suppressed in the first direction of traffic, to the reaction suppressor or anti-singing device.

The advantage of this equipment resides in the fact that the suppressors are withdrawn from the influence of those receiving currents which have already traversed the section of the communication system which has greatly changing transmission conditions or upon which considerable disturbances may enter into the transmission system. It is in principle only necessary to provide one of the subscribers with a suppressor although such suppressors are preferably provided at both stations.

An embodiment of our invention is by way of example diagrammatically illustrated in the drawing affixed to our specification. In the drawing:

Fig. 1 shows a radio duplex connection in which one of the two stations is equipped with a device for preventing the singing effects or phenomena, and Fig. 2, a preferred construction of this connection.

In both connection diagrams the double lines are shown by simple lines for the sake of simplifying the representation.

Referring to Fig. 1 of the drawing the stations of the two subscribers able to communicate with each other by duplex radio connection are indicated by the reference letters T and T'. The transmitters provided for the subscriber stations T and T' respectively are indicated by the reference letters S and S' respectively and the receivers as E and E' respectively. The lines coming from the subscribers are in known manner branched across a split (duplex) connection or fork G and G' respectively with artificial balancing networks N and N' respectively.

At the subscriber station T (transmitter S and receiver E) there is provided a speech-controlled device RS connected to the transmitting branch and which substantially comprises an amplifier and a rectifier circuit. The device RS is so connected that when it is not subject to any influence it blocks the transmitter S and leaves the receiver open. The transmission equipment from the subscriber station T' to the subscriber station T is thus in the state of rest able to transmit messages or communications, $S_1$ and $S_2$ are complementary filters, and $S_1$ may, for instance, be a limiting filter or band-suppressing filter which suppresses the frequencies between 300 and 400 cycles, while $S_2$ is a band-pass filter which only allows these frequencies to pass. In this way the result is attained that the reaction suppressor RS cannot be made to respond by the receiving currents arriving at the receiver E and returning across the fork G at the subscriber station T. The transmitter thus remains blocked and the connection is stable.

If, on the other hand, the subscriber at station T speaks the frequencies between 300 and 400 cycles contained in the speech current render the reaction suppressor RS operative whereby the receiver E is blocked and the transmitter S opened. It will be understood that instead of the frequency range of 300 to 400 cycles stated by way of example another range of the speech frequencies or message frequencies may be chosen which is less essential for the communication. A plurality of partial ranges from the total frequency range of the communication currents may equally well be chosen.

Fig. 2 of the drawing illustrates a wiring different from that shown in Fig. 1. The general arrangement of the system and the letters of reference of the elements are in principle the same as in Fig. 1 of the drawing. The essential difference consists in a different arrangement of the filters $S_1$ in the receiving path of the subscriber station T.

The position of the filter $S_1$ shown in Fig. 1 involves under certain circumstances the risk that the currents passing from the subscriber station T across the bifurcating point G also into the receiving branch are liable to be reflected at the filter and then return to the subscriber in the form of a disturbing echo.

This drawback is according to our invention eliminated by locating the filter at a point of the transmission system at which the transmission line is only permeable in the direction of the transmission. Fig. 2 of the drawing illustrates one of the application possibilities of this idea. The filter $S_1$ is located at a point in the receiving branch at which the currents passing from the subscriber station T into the receiving branch are no longer noticeable, for instance between the receiving suppressor amplifier E and the receiver proper. In this way any reflections of the current reaching the receiver branch which are liable to develop particularly strongly just at the filter are eliminated with certainty.

We claim as our invention:

1. In a two-way message transmission system, one channel for transmission in one direction and another channel for transmission in the opposite direction, a reaction suppressor controlled directly by message currents transmitted in one of said channels, a filter device in the input of said reaction suppressor which passes only message currents in a certain narrow band of the message frequency range, and a complementary filter device arranged in the other of said channels for suppressing message currents in said narrow band of the message frequency range.

2. In a two-way message transmission system, one channel for transmission in one direction and another channel for transmission in the opposite direction, a reaction suppressor controlled directly by message currents transmitted in one of said channels, a filter device in the input of said reaction suppressor which passes only message currents in a certain narrow band of the message frequency range, and a complementary filter device for suppressing currents in said certain narrow band of the message frequency range arranged in the other of said channels at a point at which transmission is possible only in the direction of the transmitted message currents.

HANS MAYER.
LADISLAUS FENYÖ.